United States Patent

Bobeck et al.

[15] 3,703,712

[45] Nov. 21, 1972

[54] MASS MEMORY ORGANIZATION

[72] Inventors: Andrew Henry Bobeck, Chatham; Henry Evelyn Derrick Scovil, Gladstone, both of N.J.

[73] Assignee: Bell Telephone Laboratories, Incorporated, Murray Hill, N.J.

[22] Filed: April 12, 1971

[21] Appl. No.: 133,206

[52] U.S. Cl. ....................... 340/174 TF, 340/174 CA

[51] Int. Cl. ....................... G11c 11/14, G11c 19/00

[58] Field of Search ....................... 340/174 TF

[56] References Cited

UNITED STATES PATENTS

| | | | |
|---|---|---|---|
| 3,618,054 | 11/1971 | Bonyhard et al. | 340/174 TF |
| 3,541,522 | 11/1970 | Bobeck et al. | 340/174 TF |

*Primary Examiner*—James W. Moffitt

*Attorney*—R. J. Guenther and Kenneth B. Hamlin

[57] ABSTRACT

Layers of materials in which single wall domains can be moved and operated in the familiar field access mode are organized in an array and operated in a word-organized block access fashion which permits an advantageous noise cancellation detection arrangement.

17 Claims, 6 Drawing Figures

INVENTORS A.H. BOBECK
H.E.D. SCOVIL
BY Herbert M. Shapiro
ATTORNEY

MASS MEMORY ORGANIZATION

FIELD OF THE INVENTION

This invention relates to data processing arrangements, and more particularly to organizations for accessing information in large capacity sequential memories.

BACKGROUND OF THE INVENTION

Sequential memories are well known in the art, typified by familiar disk files, drums, magnetic tapes and the like. Such memories require moving parts, which often cause problems, as well as relatively large amounts of power. It is generally recognized that problems of this type would be eliminated with the advent of "solid state" disk files.

Moreover, dramatic decreases in the size of disk files should also be achieved with solid state disk files. Decreases in size, however, are usually attended by the opportunity for increased capacity. But the decrease in size possible with solid state disk files is attended by an increase in capacity which is dramatically large and thus presents the problem of accessing vast amounts of information stored in memories of this type.

Single wall domain arrangements are particularly well suited for sequential memory organizations of the disk file type. Accordingly, the invention will be described illustratively in the context of this technology, it being understood that other technologies such as semiconductor charge coupled devices may be similarly well suited.

A single wall domain is a magnetic domain encompassed by a single domain wall which closes on itself in the plane of the medium in which it moves. Such a domain is a stable, self-contained entity free to move anywhere in the plane of the medium in response to offset attracting magnetic fields.

Magnetic fields for moving domains are often provided by an array of conductors pulsed individually by external drivers. The shape of the conductors is dictated by the shape of the domain and by the material parameters. Most materials suitable for the movement of single wall domains exhibit a preferred direction of magnetization normal to the plane of movement and for all practical purposes are magnetically isotropic in the plane. Conductors suitable for domain movement in such materials are shaped as conductor loops providing localized magnetic fields in first and second directions along an axis also normal to the plane. By pulsing a succession of conductors of the array consecutively offset from the position of a domain, domain movement is realized. In practice, the conductors are interconnected serially in three sets to provide a familiar three-phase shift register operation. The use of single wall domains in such a manner is disclosed in U.S. Pat. No. 3,460,116 of A. H. Bobeck, U. F. Gianola, R. C. Sherwood, and W. Shockley, issued Aug. 5, 1969.

An alternative propagation technique, disclosed in U.S. Pat. Ser. No. 3,534,347 of A. H. Bobeck issued Oct. 30, 1970, involves the generation of reorienting fields in the plane of movement of domains. Such a technique employs an overlay of magnetically soft elements (or grooves in the surface of the domain material) oriented with respect to one another to respond to a uniform reorienting in-plane field to generate changing magnetic pole patterns which attract domains to consecutive positions in a propagation channel. The latter propagation technique is particularly useful for large capacity sequential memories such as disk files.

Copending application Ser. No. 875,338 filed Nov. 10, 1969 and now U.S. Pat. No. 3,618,054, for P. I. Bonyhard, U. F. Gianola, and A. J. Perneski discloses a single wall domain mass memory organization which operates as a disk file. Information is stored in the memory in a number of domain propagation channels which define closed loop paths for the information parallel with one dimension of the slice of material in which the domains are moved. Information is organized so that a binary word consists of the like-positioned bits in the channels, consecutive words being presented consecutively at transfer positions in the channels as the information circulates. A single domain propagation channel vertical to the parallel channels functions to receive a binary word transferred from the transfer positions on command by a pulse on a conductor coupled to the transfer positions. A word so transferred is moved along the vertical channel past a read-write position defined there and is returned to the transfer positions for transfer back to the parallel channels. The channel arrangement is defined by T and bar shaped magnetically soft overlays operating in the field access mode described above.

The parallel channels are commonly referred to as minor loops, and the single vertical channel is referred to as the major loop. The minor loops can be seen to function as a permanent sequential memory presenting consecutive binary words to transfer positions whereas the major loop functions as a temporary store accepting a binary word at those transfer positions on command for circulation to an operating point for sequential read or erase and rewrite operation. Either of those operations is followed by the restoration of information to the permanent memory where it occupies vacancies created there by the initial transfer to the major loop.

BRIEF DESCRIPTION OF THE INVENTION

The present invention comprises an organization of sequential memories, illustratively of the single wall domain type described employing major and minor loops, into an array of rows and columns in which blocks of sequential information are accessed in a manner which can be understood to operate as a word organized arrangement. To be specific, in one embodiment of this invention, each of a plurality of electrical conductors of a type similar to that employed to transfer information between major and minor loops of the aforedescribed single wall domain memory is disposed to transfer information in each of a number of such memories arranged along an associated row of an array of memories. A sense conductor is arranged to detect information in any major loop along a column, actually operating to detect information from only those major loops to which information is transferred, that is to say those along a selected row.

A write conductor also couples major loops along each of the columns of the arrays in order to enter new information in place of that most recently erased. Erase conductors, on the other hand, are aligned along rows of the array. A pulse on a selected transfer conductor therefore enters a block of words to major loops in a selected row for read out by the sense conductors. A pulse on a transfer conductor followed by a pulse on the associated erase conductor, annihilates a word of that block for replacement in response to coded pulses on the write conductors. A word organized access to blocks of information results.

A unique organization of alternate rows of memories as inverted mirror images of the blocks of the adjacent row permits a sense amplifier to serve at least four neighboring memories in adjacent rows and columns in a bridge arrangement which exhibits particularly desirable signal-to-noise ratios by always pairing an unused major loop with one in the (nonselected) next row which is not being used in what can be understood as a familiar noise cancellation scheme.

DETAILED DESCRIPTION

Figure 1:
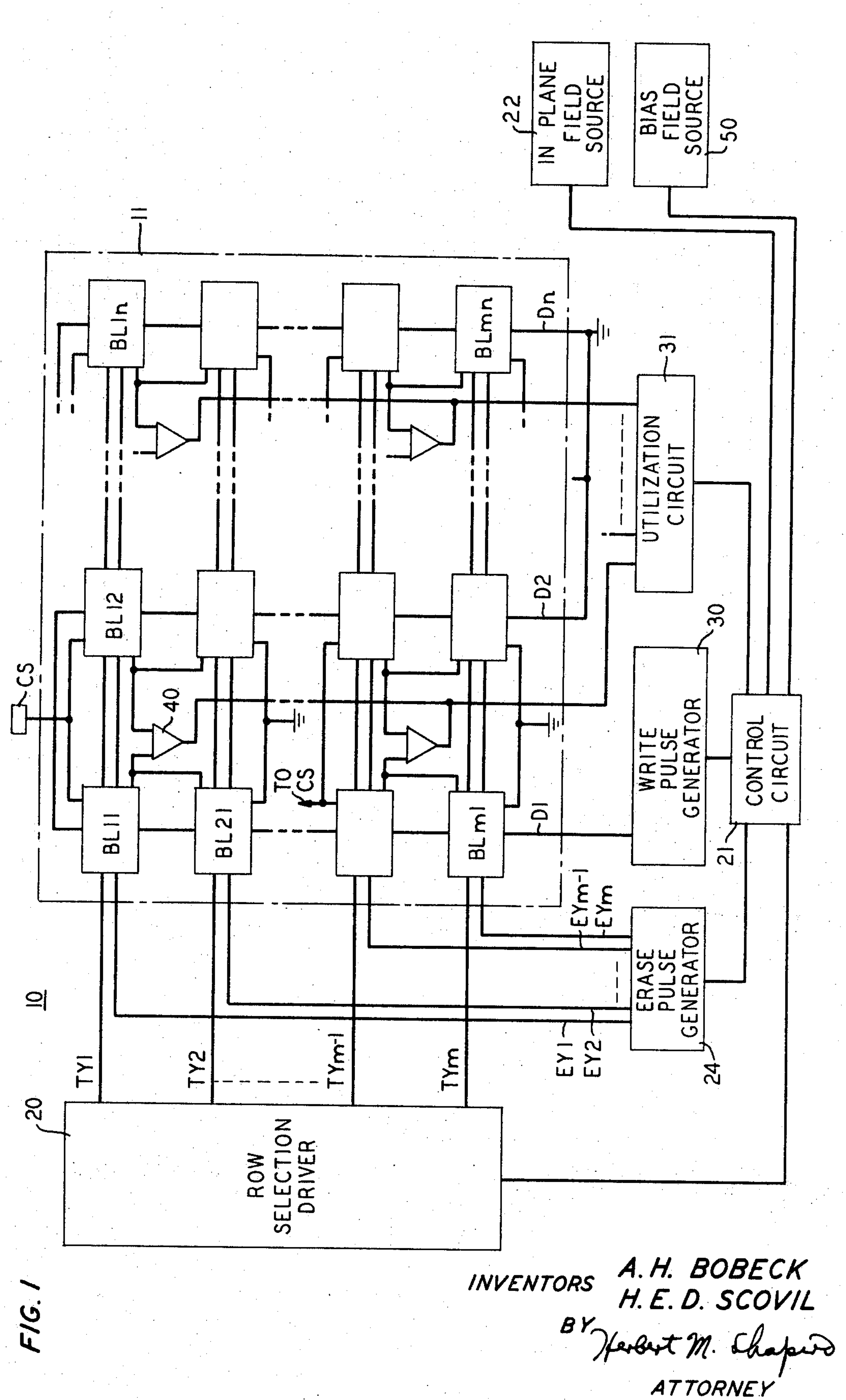
FIG. 1 is a line diagram of a memory organization in accordance with this invention.

FIG. 1 shows a memory array 10 of single wall domain arrangements organized in accordance with this invention. The array comprises typically a support member 11, such as glass, upon which slices of single wall domain materials are mounted at crosspoints as shown in FIG. 1. The slices are represented by blocks designated BL11, BL12, through BLmn, referred to collectively as BLiJ where *i* and J are dummy variables. The designations are chosen to emphasize the analogy with elements of a familiar memory array where each crosspoint is a bit location (viz., B.L.).

Figure 2:
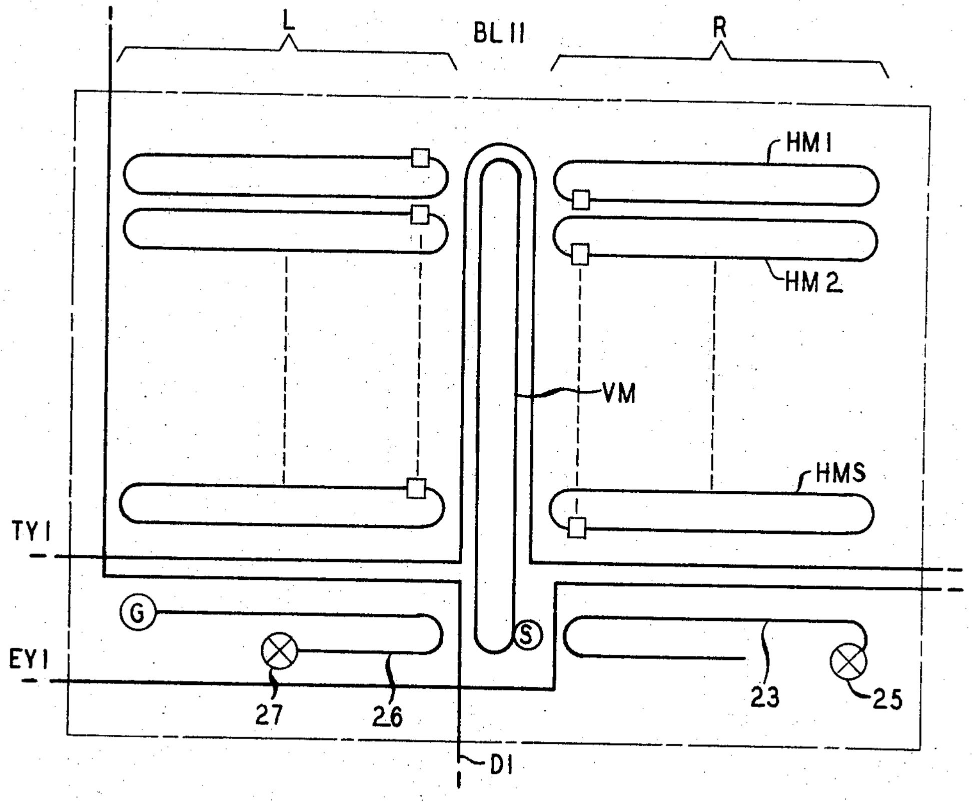
FIGS. 2, 3, 4, 5, and 6 are schematic representations of portions of the arrangement of FIG. 1.

A representative one (BL11) of the slices BLiJ employed at crosspoints of FIG. 1 is shown in FIG. 2. The general organization of the slice is disclosed in the above-mentioned copending application of Bonyhard et al. and employs horizontal minor loops HM1, HM2, through HMS in each of right and left banks of loops R and L as viewed in FIG. 2. The two banks of loops are separated by a vertically oriented closed loop called the major loop and designated VM. The minor loops are separated from the major loop by a transfer conductor TY1 which, when pulsed with a pulse of a first polarity, transfers a bit from the like position of each minor loop to consecutive positions of the major loop (viz., from one side to the other of the conductor). Each minor loop in FIG. 2 is shown with a block, undesignated, indicating the bits so transferred. Naturally, vacancies remain in the minor loops after a transfer operation.

Information is transferred in this manner for movement to the bottom of the major loop in FIG. 2 as viewed. The transfer operation is carried out by a magnetic field generated in conductor TY1 responsive to a pulse applied to the conductor by row selection driver 20 under the control of control circuit 21 of FIG. 1. It is to be recalled that information is moved synchronously in all major and minor loops herein in response to a reorienting in-plane field supplied by in-plane field source 22 of FIG. 1 in familiar fashion due to changing pole patterns generated by the field in magnetically soft patterns (not shown) on the slices BL*iJ*. Domains so moving and transferred arrive at the bottom of the representative major loop VM.

There are alternative operations which might occur when information is so moved in a major loop. First, a read operation may occur in response to a signal under the control of control circuit 21. The read operation involves the movement of the domain pattern past a detector designated S in FIG. 2 in familiar fashion. The organization of various detectors for providing an improved detection arrangement for the array of FIG. 1 is described hereinafter. An individual detector may comprise, for example, a magnetoresistive device of the type described in copending application Ser. No. 882,900 filed Dec. 8, 1969 and now U.S. Pat. No. 3,609,720, for W. Strauss, or a two-terminal adaptation thereof. The major loop is operative to return information to (transfer) positions from which the information is returned to the originating minor loops in response to an opposite polarity pulse in conductor TY1. When such a pulse is applied, the domain pattern in the major loop is returned to vacancies in the minor loops which were created by the transfer of information when conductor TY1 was previously pulsed.

Alternatively, a write operation may occur in response to a second signal also under the control of control circuit 21. As was the case in the read operation, the write operation is initiated by a transfer of information from the minor loop to the major loop, the latter again functioning as a temporary store. But in this instance, the information transferred is annihilated and replaced by new information which is thereafter transferred back into the minor loops to occupy the vacancies left by the preceding transfer of information from the minor loops. The write operation accordingly includes transfer, annihilate, and write operations followed by a return of information to the positions from which the annihilated information originated.

The implementations for the erase and write operations are conveniently also defined by magnetically soft overlay elements and thus are synchronized with domain movement in the major and minor loops by the reorienting in-plane field. The erase implementation, for example, illustratively comprises a spur track (or channel) 23 about which domain patterns move clockwise as viewed. When conductor EY1 of FIG. 2 is pulsed by an erase pulse generator 24 of FIG. 1, information (a domain or absent domain) moves from the major loop VM of FIG. 2 to track 23 for movement to an annihilator 25. Annihilator 25 may comprise a magnetically soft disk-shaped element about the periphery of which a single wall domain moves as the in-plane field reorients, as shown for example in copending application Ser. No. 795,148, filed Jan. 30, 1969 and now U.S. Pat. No. 3,577,131, for R. H. Morrow and A. J. Perneski. Such a domain is always in a position to coalesce with a domain advancing along track 23 and thus functions to annihilate the latter domain. We will assume information moves clockwise in the various loops of FIG. 2. Accordingly, the transfer of information from a bit location in the major loop to spur track 23 leaves a vacancy moving clockwise in the major loop. Pulse generator 24 is under the control of control circuit 21 as indicated in FIG. 1.

The write implementation functions to store new information in the major loop at vacancies therein produced by the transfer of information to spur track 23. This information also employs a spur track designated 26 in FIG. 2. Again, information is assumed to move clockwise as viewed. The track begins at a domain generator represented by an encircled G and terminates at a domain annihilator 27. One suitable generator is disclosed in U.S. Pat. No. 3,555,527, of A. J. Perneski issued Jan. 12, 1971. Generator G illustratively is adapted by suitable geometry changes to provide relatively strong poles to generate a domain for each cycle of the in-plane field in a manner well understood in the art. Every domain so generated moves along spur track 26 to annihilator 27 unless it is transferred to the major loop. Such a transfer is controlled by a pulse in a write conductor D1 provided by write pulse generator 30 of FIG. 1 under the control of control circuit 21, and when such pulse is applied results in the movement of a domain into a corresponding vacancy created at the "erase" position.

The write operation thus comprises a pulse in conductor TY1, a pulse in conductor EY1, and (selectively) a pulse or the absence of a pulse in conductor D1 for storing a domain (viz., a binary one) or the absence of a domain (viz., a binary zero). The entire operation is synchronized with the reorienting in-plane field which causes domain movement in the slice and culminates in a oppositely poled pulse in conductor TY1 when the newly stored information occupies proper positions for transfer to the minor loops.

In FIG. 1, the write conductor D1 for column 1 is shown connected to the write conductor D2 for column 2. The designations employed relate the conductors to the columns as shown. But actually, the write conductors for adjacent columns are the same, as will become clear from the discussion of the bridge sense arrangement hereinafter.

The overall organization of major-minor loops operative as described is now well known in the art. Moreover, domain transfer via pulsed conductors and domain generators as well as domain annihilators also are now well understood in the art. Consequently, such elements are merely described functionally herein without further discussion of the details of implementation.

Individual slices of domain material, operated, as described in connection with FIG. 2, are organized in an array generally as shown in FIG. 1. Each transfer conductor, as for example TY1, is adapted to couple serially each of the arrangements of FIG. 2 arranged along the associated row of FIG. 1. Visualize arrangements BL11, BL12, through BL1N of FIG. 1 in this connection. Consequently, a pulse in conductor TY1 transfers the corresponding bits in the minor loops of each of the so coupled arrangements into the corresponding major loops leaving vacancies behind. As the in-plane field reorients, the consecutive bits of information move clockwise in the major loops past respective (detection) positions at which, say, a read operation occurs eventually returning to the positions at which the bits entered the major loop.

If each slice (BL*iJ*) contains eighty minor loops in each arrangement depicted in FIG. 2 along with a 249-stage major loop and 48 slices in a row accessed by a transfer conductor, a pulse in a transfer conductor can be seen to initiate an operation where 480 24-bit words pass detectors. If each of detectors of the slices of all the columns of FIG. 1 are activated, utilization circuit 31 of FIG. 1 operates to receive consecutive words of an entire block of information and the memory can be understood as operating in block access, "word-organized" mode. Because of the spacings between adjacent minor loops, the transfer of a single bit from each minor loop to a major loop would not result in full occupancy of the major loop. Consequently, two or three bits are transferred. The present numbers are for the transfer of three bits. Consequently, 240 bits are transferred. The major loop has an extra nine stages to accommodate write, erase, and read positions. The number of transfer pulses, of course, corresponds to the actual number of consecutive bits (here three) transferred.

Similarly, during a write operation, a transfer pulse on conductor TY1 is followed by two hundred forty pulses on erase conductor EY1 which annihilates all information transferred to the major loop. The erase pulses are interspersed with pulses (or absent pulses) or write conductors D1 through D*n* to replace the erased information. The reason the pulses are interspersed, of course, relates to the physical positioning of (viz. the number of periods of the T-bar pattern between) the transfer positions between spur 23 and the major loop and spur 26 and the major loop. If these positions are say five stages apart, that is five periods of the magnetically soft overlay pattern, five cycles of the in-plane field cause the vacancy created by erasure at the first (erase) position to advance to the second (write) position for reoccupancy. In this context, five erase pulses occur, then the write pulses are interspersed with the erase pulses, and the last erase pulse is followed by five write pulses (or absent pulses).

It is to be noted that the transfer and erase conductors are oriented along rows of arrangements as shown in FIGS. 1 and 2. Naturally, pulses in these conductors affect domains in all the arrangements of the selected row alike, but the write conductors are aligned along columns and thus affect arrangements in nonselected rows by writing new information into all the major loops in the array. This information, of course, is spurious in all but the selected row. But it is easily eliminated after the information is recirculated once in the major loops and actually transferred to the minor loops of the selected row. For example, as the in-plane field recycles after that transfer, consecutive pulses on all the erase conductors eliminate information from the major loops. Since the newly stored information passes detector positions prior to annihilation in this manner, the information can be checked for correctness at this juncture.

FIG. 1 shows separate sense conductors for each pair of columns of the array. Since only one row of arrangements is accessed at a time, the organization permits the sharing of a sense amplifier by like arrangements in adjacent rows. Further, by orienting adjacent arrangements in a row one hundred eighty degrees with respect to one another, one amplifier can be shared by four neighboring arrangements with a doubling of the data rate. The resulting organization is shown in FIG. 3 for a representative set of four arrangements BL11, BL12, BL21, and BL22 of FIG. 1.

Figure 3:
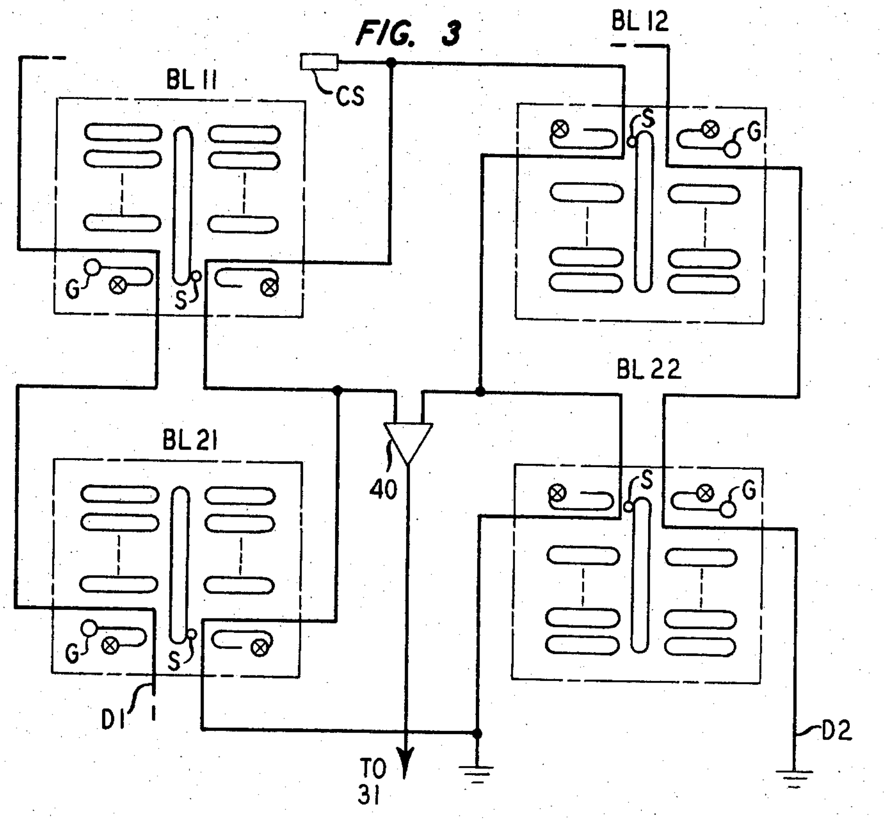

To be specific, FIG. 3 shows the detectors S of each of arrangements BL11, BL12, BL21, and BL22 connected between an amplifier 40 and a source of current (2 I*dc*) designated *cs* and ground, the output of the amplifier being connected to utilization circuit 31 of FIG. 1. The relationship between arrangements BL21 and BL22 on the one hand and arrangements BL11 and BL12 on the other can be seen to comply with the one hundred eighty degree out-of-phase relationship mentioned above by comparing the position of the encircled G in the arrangements.

Figure 4:
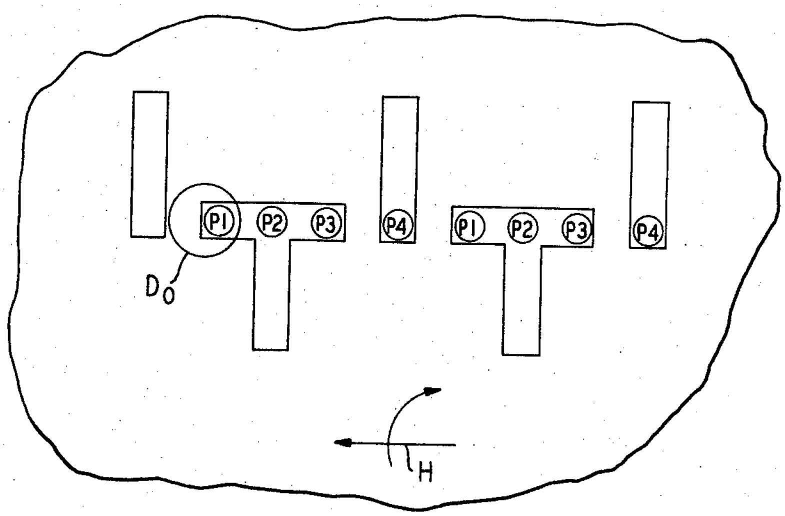
Figure 5:
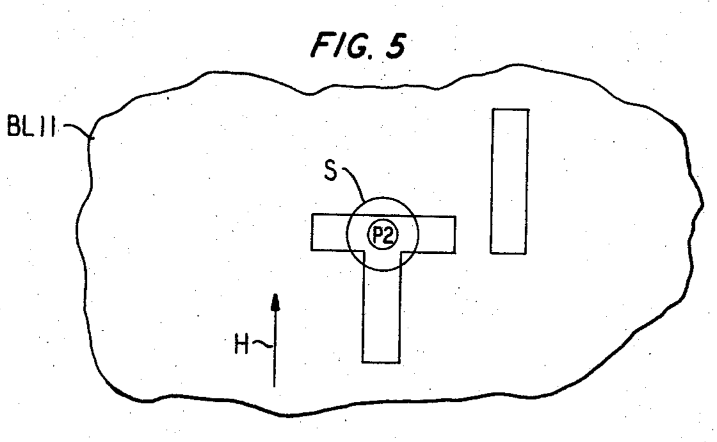
Figure 6:
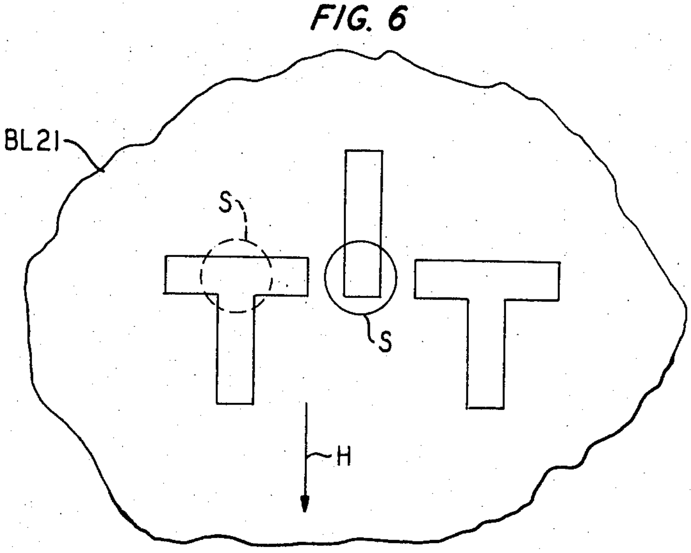

The reason for this out-of-phase relationship can be explained in terms of an illustrative overlay geometry. FIG. 4 shows a representative section of such an overlay of a geometry to respond to move a domain to the right as viewed in the figure in response to a clockwise rotating in-plane field. The field in represented by the arrow H in the figure and the direction of rotation is indicated by the curved arrow. A domain DO of a prescribed diameter determined by the value of a bias field supplied by bias field source 50 of FIG. 1, moves consecutively from the position shown in FIG. 4 to the positions P2, P3, and P4 into the next adjacent stage defined by the period of the pattern shown. A detector (S) is disposed to correspond to a prescribed one of four positions of a major loop occupied by a domain during a cycle (viz., one stage) of the in-plane field. For arrangements BL11 and BL21 of FIG. 3, this position may be a position P2 as shown in FIG. 5. For the arrangements in an adjacent column (viz., BL12), a detector S to be positioned 180° out of phase with the detector in FIG. 5 would occupy the position shown in FIG. 6. But it is desirable to manufacture all arrangements with identical patterns of magnetic elements—that is as shown in FIG. 2. In order to achieve the relationships shown in FIGS. 5 and 6 and still have all the arrangements alike, the relationship of FIG. 3 is employed. The proper relationship can be seen to be achieved by thinking of the T and bar pattern of FIG. 6 as rotated about an axis normal to the plane of the drawing 180° from the orientation shown in the figure and comparing the result with FIG. 5. A detector positioned at the broken circle in FIG. 6 can be seen to be identically placed with respect to the overlay pattern, but still 180° out of phase with the detector in FIG. 5.

Amplifier 40 can be seen to be incorporated in a bridge arrangement in which voltages due, for example, to a rotating in-plane field in arrangement BL11, BL12, BL21, and BL22 cancel one another. Any difference in voltage applied by the detectors S to amplifier 40, then, is due to the presence of a domain at the detector in arrangement BL11 and BL12 or BL21 and BL22, depending on which row of the array of FIG. 1 is presently accessed. Because of the 180° phase relationship described above, in any cycle of the in-plane field, the signals from BL11–BL12 and from BL21–BL22 are out of phase and do not interfere. Rather they result in a doubling of the effective data rate because two outputs are obtained from the slices in adjacent columns and the selected row for each cycle of the in-plane field. Consequently, amplifier 40 can service at least four arrangements of the type shown in FIG. 2.

Of course, amplifier 40 can be connected to detectors of more than four slices. For example, eight slices may provide four sets of outputs for each cycle of the in-plane field by, for example, orienting pairs of slices at 90° with respect to one another maintaining slices of each pair at 180° with respect to one another.

In summary then, each arrangement of the type shown in FIG. 2 and occupying a crosspoint of the array of FIG. 1 functions generally as disclosed in the copending application of Bonyhard et al. noted above. The organization of arrangements of this type for accessing on a word-organized (alternatively random access) basis described in accordance with this invention permits access of blocks of information in a generally sequential memory of the disk file type resulting in relatively low access times when compared to conventional disk files of corresponding capacity.

The advantages of an organization in accordance with this invention would perhaps be understood better from a comparison between a conventional disk file of given capacity and cycle time with a disk file organized in accordance with this invention having comparable capacity and cycle time. Consider a presently realizable single wall domain disk file which comprises T- or Y-bar overlay patterns with a 0.75 mil period. A 19,920-bit circuit would, then, require and epitaxial garnet chip approximating 60 by 190 mils on a side--presently realizable. Eighty minor loops are easily defined for domains 4 microns in diameter in an epitaxial layer of, for example, Europium Erbium Gallium garnet. Twenty-four blocks to a row, as shown in FIG. 1, provide 637,440 words, or almost 15,300,000 bits. Such an arrangement can be operated with presently available materials at above a 200-kilocycle word data rate with an average access time of 2.4 milliseconds in response to an in-plane field rotating at only 100 kilocycles. The average size of an individual domain slice as shown in FIG. 2 is 0.062 inch by 0.190 inch. Transfer pulses, erase pulses, and write pulses are typically 20 milliamperes. A typical output observed with the arrangement of FIG. 3 is 0.2 millivolt.

In comparison, a disk file with 15,300,000 bits operates at a 200 KC word data rate and has an average access time of 33 milliseconds and occupies typically 8 cubic feet of space.

What has been described is considered merely illustrative of the principles of this invention. Therefore, various modifications can be devised by those skilled in the art in accordance with those principles within the spirit and scope of the invention.

What is claimed is:

1. A combination comprising a first plurality of sequential memories each for circulating information in closed loop fashion and normally being free of information, said memories being organized in rows and columns, first means responsive to a first signal for erasing information in said memories in selected ones of said rows, second means responsive to a second signal for selectively writing information in each of said memories in a selected one of said rows, third means for selectively reading information in each of said memories in said columns, a second memory associated with each of said first plurality of sequential memories, and means for transferring information from said second to associated ones of said first memories in a selected one of said rows and for returning information from said first to associated second memories along said selected row in a timed sequence.

2. A combination in accordance with claim 1 wherein each of said plurality of sequential memories comprises a layer of material in which single wall domains can be moved and is defined by a pattern of elements which provide changing pole patterns for moving single wall domains responsive to a reorienting in-plane field.

3. A combination in accordance with claim 2 wherein each of said second memories comprises a plurality of channels defined by said patterns of elements for circulating domains thereabout, each of said channels including a transfer position through which consecutive bits in said channel pass in response to said reorienting in-plane field.

4. A combination in accordance with claim 3 wherein said means for transferring comprises an electrical conductor encompassing the ones of said first sequential memories disposed in an associated row and coupling the transfer positions of the ones of said second memories associated with each first memory so encompassed for transferring bits of information therebetween when pulsed.

5. A combination in accordance with claim 4 wherein said first means comprises a first spur track defined by said magnetic pattern and including a domain annihilator for annihilating domains moved thereto in response to said reorienting in-plane field and an electrical conductor for transferring bits of information from said first memories to associated first spur tracks for annihilation when pulsed.

6. A combination in accordance with claim 5 wherein said second means comprises a second spur track associated with each of said first memories and includes a domain generator at its beginning and terminates in a domain annihilator for annihilating domains not transferred from said second spur track to the associated one of said first memories, and an electrical conductor for selectively transferring domains from said second spur track to said associated first memory in said columns.

7. A combination in accordance with claim 6 wherein alternate ones of said first memories along one of said rows is an upside down mirror image of the adjacent one of said first memories.

8. A combination in accordance with claim 7 wherein said third means comprises a detector at a first position in each of four neighboring ones of said first memories in pairs in adjacent ones of said rows and columns and includes an amplifier connected in a bridge organization for each group of four detectors in said neighboring ones of said first memories.

9. A combination in accordance with claim 8 wherein each of said detectors of said pair of neighboring first memories in a first row are connected between a current source and inputs to said amplifier and each of said detectors of said pairs in a second row are connected between said inputs and ground.

10. A combination in accordance with claim 3 wherein said elements comprise magnetically soft material and including means for providing said reorienting in-plane field.

11. A combination comprising, first, second, third and fourth slices of magnetic material in each of which single wall domains can be moved, a pattern of magnetic element juxtaposed with each of said slices for defining in each a major and a plurality of minor loops for circulating domain patterns thereabout, means for transferring information between minor loops and the associated major loops for movement of information to a detection position in said associated major loops, a detector at each of said first, second, third and fourth detectors coupled to said first, second, third and fourth slices respectively at said detection positions, an amplifier having first and second inputs and an output, said first and second detectors being connected between a signal source and said first and second inputs to said amplifier respectively, said third and fourth detectors being connected between said first and second inputs and ground.

12. A combination in accordance with claim 11 including means for providing a magnetic field reorienting in the plane of said slices for generating changing pole patterns in said elements for moving domains synchronously in said major and minor loops.

13. A combination in accordance with claim 12 wherein said elements are magnetically soft material in a repetitive pattern to respond to said field for moving domains as said field rotates in said plane.

14. A combination in accordance with claim 13 wherein each period of said repetitive pattern includes first and second positions for domains when said field has first and second orientation 180° apart and said detectors of said first and second slices occupy said first positions in their respective major loops and said detectors of said third and fourth slices occupy second positions.

15. A combination in accordance with claim 13 wherein said pattern of elements of said slices are alike having said detectors of all of said slices positioned in like positions with respect to said pattern, said third and fourth slices being rotated about an axis normal to the plane of the slice 180° with respect to the patterns of said first and second slices.

16. A combination in accordance with claim 14 also including transfer means comprising first and second conductors coupled to said major loops in said first and second and said third and fourth slices respectively for moving information from said minor loops into the associated one of said major loops and for returning said information to the originating minor loops in a timed sequence responsive to a first signal.

17. A combination comprising a plurality of slices of materials in which single wall domains can be moved, a pattern of elements for defining in each of said slices a plurality of minor loops and a major loop for circulating domain patterns therein in response to a magnetic field reorienting through consecutive of phases in the plane of said slices, a domain detector at a first position in each of said major loops, and an amplifier having first and second inputs and an output, the detectors of said slices being connected between said inputs and a power source and ground in a bridge arrangement, said detectors being disposed with respect to said patterns and said in-plane field such that signals are provided by said detectors during different phases of said field.

* * * * *